March 12, 1940. C. PRATER ET AL 2,193,041
OIL TREATING HEATER AND THE LIKE
Filed Nov. 1, 1937 3 Sheets-Sheet 1
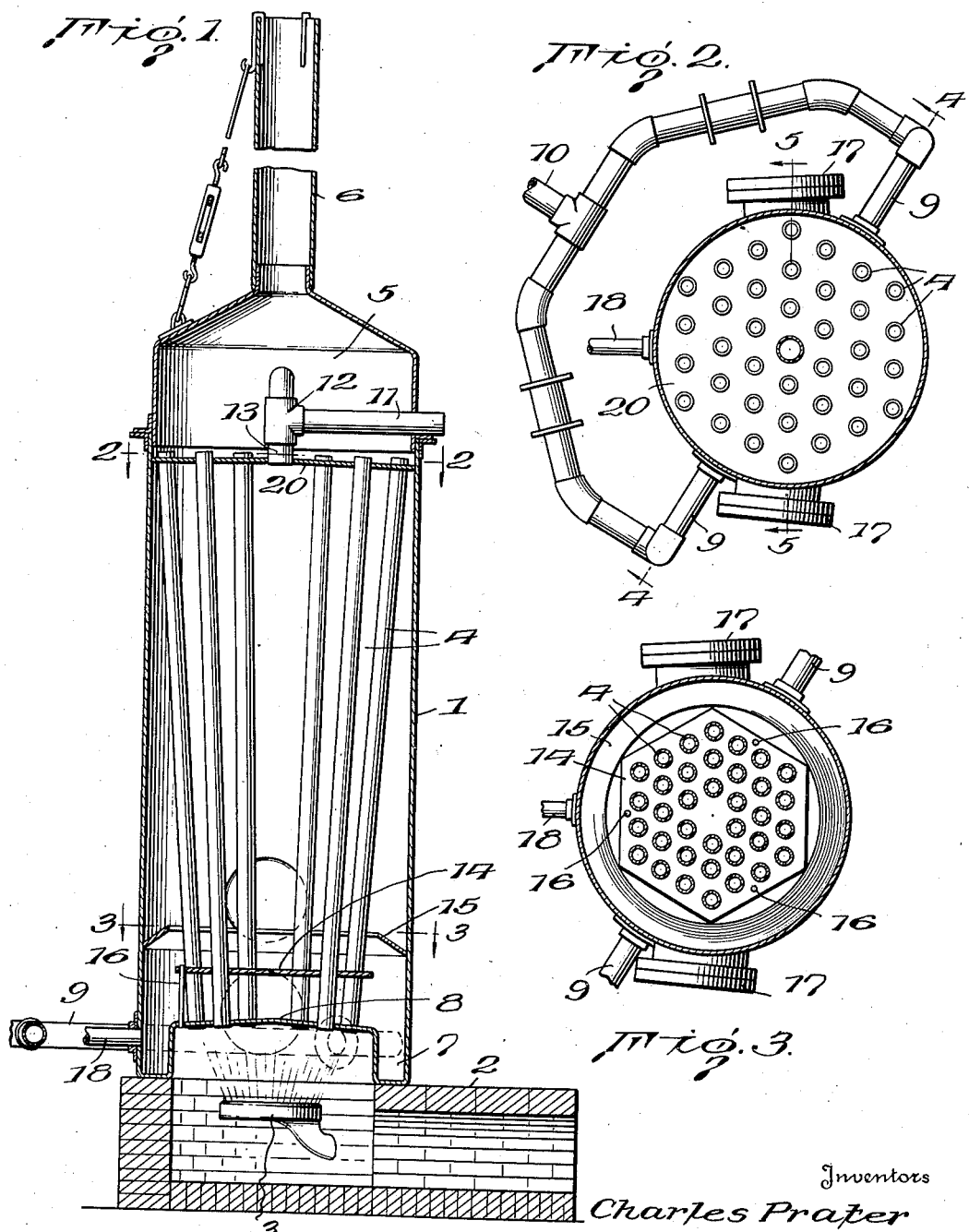
Inventors
Charles Prater
Harold F. Brindel
By G. M. Houghton
their Attorney Inventors
Charles Prater
Harold F. Brindel
By A. M. Houghton
their Attorney

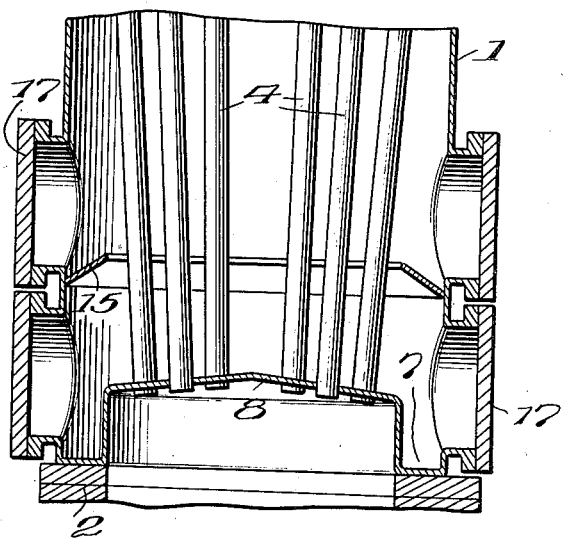
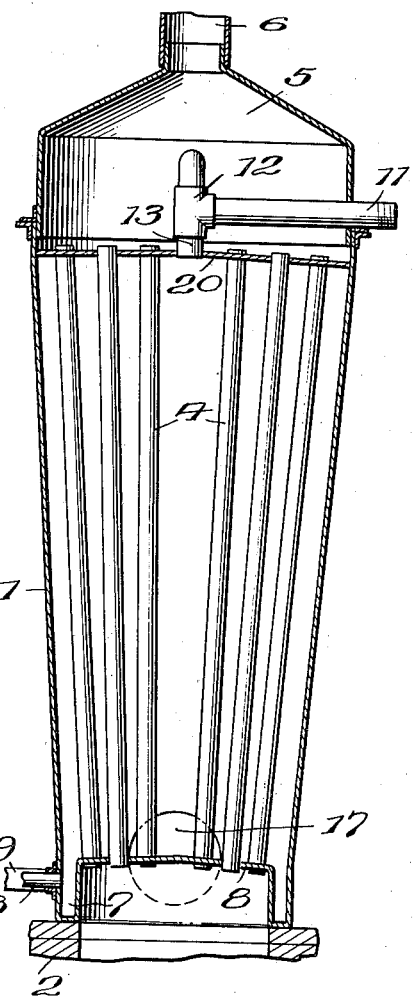
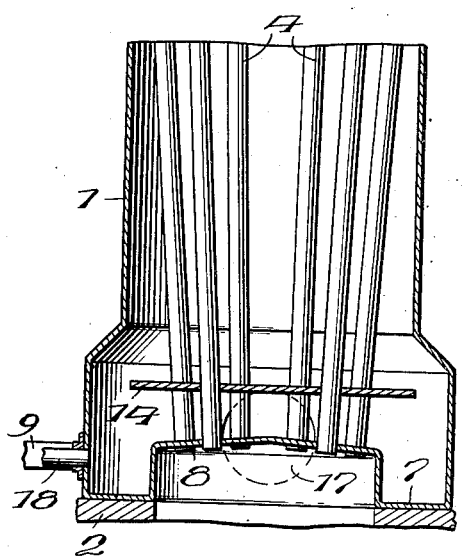

Patented Mar. 12, 1940

2,193,041

UNITED STATES PATENT OFFICE 2,193,041

OIL TREATING HEATER AND THE LIKE

Charles Prater, Seminole, and Harold F. Brindel, Tulsa, Okla., assignors to Gulf Oil Corporation, Pittsburgh, Pa., a corporation of Pennsylvania Application November 1, 1937, Serial No. 172,246

5 Claims. (Cl. 122—115)

This invention relates to oil treating heaters and the like; and it comprises a heater of the fire-tube type for treating naturally occurring petroleum emulsions and the like, said heater having baffles or like means provided therein to control the direction and rate of movement of the emulsion through the heater and to thereby minimize precipitation of salts and formation of scale in the heater, said means being arranged to receive such salts and scale-forming matter as are precipitated in the heater or to prevent accumulation of such matter on the flue sheet of the heater; and the invention further comprises the provision of manholes or clean-out doors suitably arranged to provide access for cleaning, all of which may suitably be fabricated from light weight materials to facilitate transportation; all as more fully hereinafter set forth and as claimed.

Most crude petroleum oil as it is received from wells, and particularly from pumped wells, is accompanied by varying percentages of water. Some of this water separates readily from the oil on standing in a tank, but frequently the oil still contains from 2 per cent to 30 per cent of water in emulsified form, even after standing. This water, which contains relatively large amounts of dissolved salts and other mineral matter, must be separated before the oil can be processed or delivered to a pipe line for transportation to some distant point for processing. Separation of the emulsion can sometimes be effected by the addition of certain chemicals to the cold mixture of oil and water. In most cases, however, separation is facilitated by heating the mixture, and a marked saving in the amount of chemicals used and time required for the separation is simultaneously effected.

When heating is employed to aid in breaking the emulsion, it is best accomplished by passing the emulsion as rapidly as possible through a suitable heater and into a large storage or settling tank. The process used may be a cyclic one in which the emulsion is continuously withdrawn from the tank and passed through the heater and back to the tank again, or it may be a batch process. In any event it is desirable to keep to a minimum the separation of water or solid matter in the heater, and to have this separation take place as completely as possible in the settling tank.

Heretofore heaters for treating such emulsions were constructed of heavy weight material, even though the operating pressures of such heaters is relatively low, such as approximately 10 lbs. per square inch. This heavy construction was employed chiefly for the reason that the large and rapid accumulations of scale generally encountered in the heaters made light weight material apt to burn through quickly, with disastrous results. Since such heaters were frequently moved from well to well or from oil field to oil field, however, their transportation involved considerable expense and labor.

The present invention overcomes the above difficulties by the provision of baffles or their equivalents suitably arranged in the heater to prevent large accumulations of salts and scale on the flue sheet thereof, thus making feasible the construction of a heater of light weight material which can be cheaply constructed and transported quickly and easily, at slight expense and with little or no likelihood of damage.

It is an object of the present invention to provide a relatively light weight, low pressure, fire-tube type of heater especially adapted for treating oil-water emulsions.

Another object of the invention is the provision of suitable baffles within the heater to promote efficient circulation of the emulsion through the heater with minimum separation of solid matter, said baffles being also arranged to receive matter precipitated in the heater and to prevent the accumulation of such matter on the flue sheet of the heater.

A still further object of the invention is to provide means for gaining ready access to the baffles and other internal parts of the heater for cleaning.

Other objects and advantages of the invention will be apparent from the following detailed description read in connection with the accompanying drawings, wherein—

Fig. 1 is a vertical sectional view of one form of the heater;

Fig. 2 is a horizontal sectional view of the heater taken along line 2—2 of Fig. 1 in the direction of the arrows;

Fig. 3 is a horizontal sectional view of the heater taken along line 3—3 of Fig. 1 in the direction of the arrows;

Fig. 7 is a view similar to Fig. 5 of another modified form of heater;

Fig. 8 is partial vertical sectional view of a modified form of the heater shown in Fig. 6; and Fig. 9 is a vertical sectional view of another modified form of heater embodying the invention.

Figure 4:
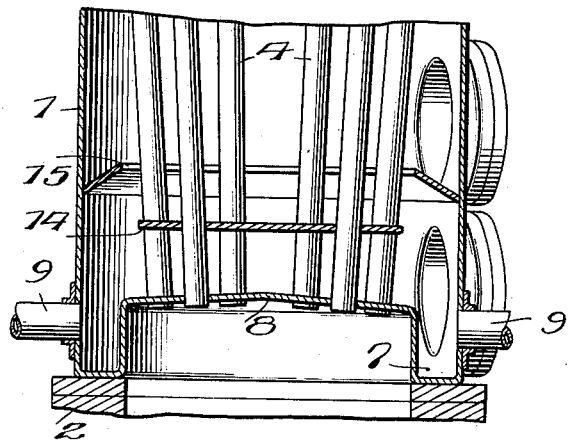
Fig. 4 is a vertical sectional view of a portion of the heater taken along line 4—4 of Fig. 2 in the direction of the arrows.

Referring to the drawings, wherein like numerals indicate corresponding parts throughout the several views, the numeral 1 designates generally the heater which is mounted upon a brick hearth or fire box 2 containing a burner 3. Products of combustion from the burner pass upwardly through fire tubes 4 of the heater into a space 5 above the heater, from which they are discharged into the stack 6. The heater is provided at the bottom with an annular depending jacket or water leg 7 which cooperates with a flue sheet 8 located immediately over the burner to form side and top portions of the fire box. The inlet to the heater for emulsions is advantageously through a plurality of pipes 9, which are preferably arranged diametrically opposite each other on the sides of the heater and communicating with the lower end of the heater below the flue sheet 8 and near the bottom of the water leg 7. The pipes 9 are connected by means of suitable additional piping to the main feed pipe 10 as shown. The outlet for the heated emulsified oil is through pipe 11 which communicates with the top of the heater, preferably centrally thereof through the T connection 12 and nipple 13. In heaters of the form illustrated in Fig. 1, for example, there are provided baffles 14 and 15 which have the dual purpose of controlling circulation of fluid in the heater and preventing or at least minimizing accumulation of precipitated matter on the flue sheet 8.

The flue sheet 8 or bottom tube sheet is advantageously convex upwardly, or inclined from the center towards the edges, as shown, so that any sludge or precipitate which collects on this sheet will drain into the mud ring or water leg 7. This construction assists in minimizing scale formation on the highly heated flue sheet, and is especially desirable in modifications of the heater described hereinbelow in which one or both of the baffles 14 and 15 may be omitted. The slope or radius of curvature of the sheet may be varied as desired.

The recessed form of the bottom of the heater consisting of the flue sheet and the water leg is also advantageous in that it imparts flexibility and reduces internal stresses arising from different temperature conditions in different parts of the apparatus. This flexibility makes it feasible to attach the tubes rigidly to the tube sheets, as by welding, which minimizes leakage.

Baffle plate 14 is positioned immediately above the flue sheet, but spaced therefrom by means of studding or stud bolts or the like, 16. Baffle plate 15 is positioned a relatively short distance above baffle plate 14 and consists of an annular inverted funnel-shaped sheet of metal closely contacting the sides of the heater but provided with a central opening of approximately the same diameter as the baffle plate 14. Because of this construction and arrangement, emulsion entering the heater must follow an S shaped path around the baffles and any matter which precipitates from the emulsion above the baffle plates is caught on the baffles. From time to time it is necessary to clean the baffles, and for this purpose manhole openings 17 are provided in the sides of the heater adjacent the baffles.

As shown, four manholes are desirably provided, and these are arranged in pairs one above the other on diametrically opposite sides of the heater. The lower pair provides access to the lower portion of the heater, including the lower or flue sheet baffle, while the upper pair gives access to the upper baffle as well as to the lower baffle. The lower baffle 14 and its supports 16 may sometimes be omitted, as shown in Fig. 7; and as a further alternative this baffle may be made convex or conical in form, if desired.

The emulsions of oil and water normally pass through the heater at such high velocity that there is little or no opportunity for the free water to settle out, but there is nearly always some separation of water from the mixture. This separated water settles into the ring or leg 7, and is withdrawn from time to time, or continuously, through a pipe 18. The upper ends of the tubes 4 are conveniently secured in position by welding to a partition or upper tube sheet 20, which divides the interior of the heater into a liquid-heating space and the gas space 5.

Figure 6:
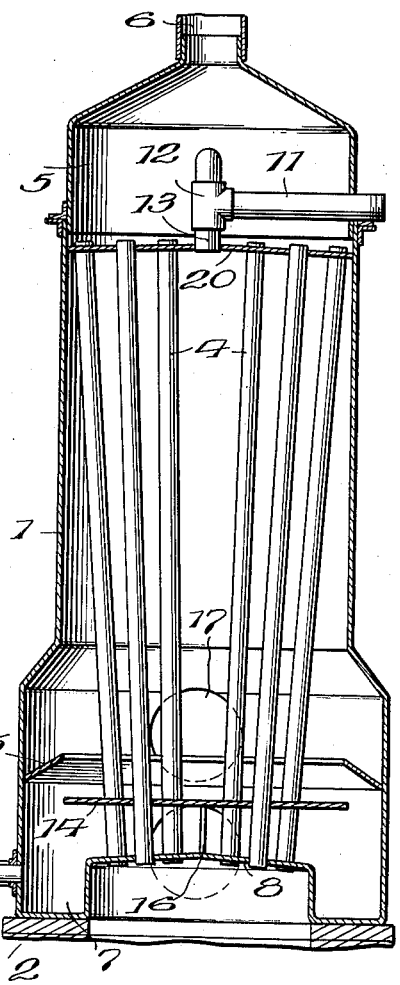
Fig. 6 is a vertical sectional view of a modified form of heater embodying the invention.
Figure 5:
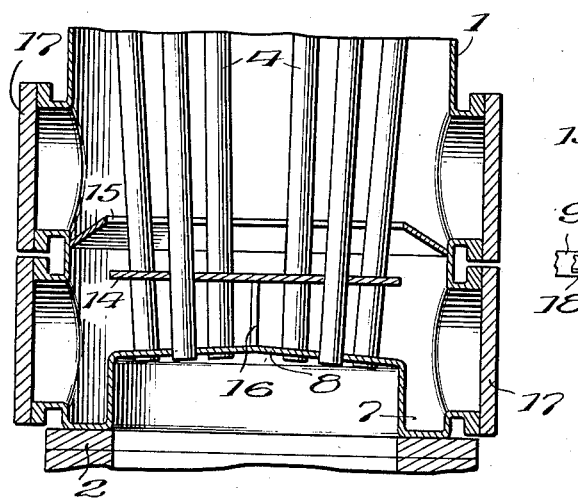
Fig. 5 is a vertical sectional view of a portion of the heater taken along line 5—5 of Fig. 2 looking in the direction of the arrows.

In Fig. 6 a modified form of heater is shown wherein the upper cross-sectional diameter of the heater is reduced in diameter to approximately the diameter of the baffle 14. This construction may also include the baffle 15 arranged around the inner side walls of the heater, as shown, but in this modification the baffle is not always necessary, because matter settling out of the emulsion above baffle 14 is guided by the sides of the heater onto baffle 14. If the reduced portion of the heater is arranged a great distance above baffle 14, it is best to use the additional baffle 15 as shown in Fig. 6 to catch precipitated matter; but in other cases this baffle may be omitted, as shown in Fig. 8.

Fig. 9 illustrates another form or modification of the heater design in which the outer shell is tapered to be substantially parallel with the outer row of tubes 4 throughout a substantial part of its length. In this design, the taper of the shell and the slope of the flue plate 8 direct any precipitate which forms into the water-leg or mud ring 7, whence it is readily withdrawn, and the baffles employed in the previously described modifications may therefore be omitted. In this simplified form of the invention it is also possible to dispense with the upper manholes 17.

In all modifications of the invention a feature of the design is that the slope or inclination of the tubes 4 and the manner of supplying emulsion to the heater at the lower outer part of the shell, preferably at two or more points, while withdrawing only through a central outlet at the top of the shell, causes a flow across the tubes. This design eliminates dead pockets and over-heating and leads to more efficient heat transfer than can take place when the flow is substantially parallel to the tubes.

As already stated, it is best when heating oil-water emulsions to pass the emulsion in a continuous, rapidly moving stream through the heater. Separation of solid matter in the heater is distinctly disadvantageous, but to a certain extent precipitation cannot be avoided. The present invention provides an efficient and inexpensive form of heater for treating such emulsions. Currents in the emulsified fluid, created by the baffles or the flow across and around the tubes, tend to keep the precipitated matter in suspension, while at the same time any matter that does precipitate is prevented from settling on the flue sheet and forming there a hard thick layer of scale which is dangerous and difficult of removal.

The heater of the present invention is simple in construction and is relatively inexpensive to manufacture. Its light weight enables it to be quickly and easily transported from place to place as occasion demands, and the arrangement of its baffles and manholes permits ready cleaning as well as increasing its efficiency and length of life.

What we claim is:

1. In a heater, a substantially vertical shell having sides and a closed lower end and a transverse partition spaced upwardly from said closed end and separating a liquid-heating space below the partition from a flue gas space above the partition, a combustion chamber positioned beneath the shell, tubes for conducting products of combustion from said chamber to said gas space above the partition, a horizontal, centrally located baffle plate positioned in the lower portions of said heater a short distance above said closed end, the side edges of said baffle plate approaching but not contacting the side walls of the heater, a second baffle plate positioned a short distance above the first named baffle, said second baffle being substantially an annular flat ring shaped member extending inwardly from the walls of said heater, and conduits for supplying liquid to and withdrawing liquid from said liquid-heating space.

2. In a heater, a substantially vertical shell having sides and a closed lower end and a transverse partition spaced upwardly from said closed end and separating a liquid-heating space below the partition from a gas space above the partition, a combustion chamber positioned beneath the shell, tubes for conducting products of combustion from said chamber to said gas space above the partition, conduits for supplying liquid to and withdrawing liquid from said liquid-heating space, a baffle mounted in said liquid-heating space a short distance above and substantially parallel with a central portion of the closed lower end of the shell, means on said closed lower end for supporting the baffle in position and a second baffle extending inwardly and upwardly from the sides of the shell above the first-mentioned baffle, said second named baffle being supported in position by the side walls of the heater.

3. A heater of the fire-tube type for treating oil-water emulsions and the like which tend to precipitate scale-forming substances when heated, comprising a shell having a side wall and a closed bottom including a centrally disposed flue plate and an annular chamber extending below said flue plate, a transverse partition in the upper part of said shell separating a liquid heating space below the partition from a flue gas space above the partition, tubes extending through said liquid-heating space and adapted to conduct products of combustion from a space below the flue plate to the gas space above the partition, means for effecting an upward flow of liquid through said liquid-heating space, a substantially horizontal baffle plate surrounding said tubes adjacent but spaced slightly from said flue plate and having edges spaced from the side wall of the shell, an annular frusto-conical surface extending inwardly and upwardly from the lower portion of the side wall of the shell above said baffle, and an opening in the side wall provided with a removable closure and adapted to facilitate cleaning of the baffle.

4. In a heater having a substantially vertical chamber for heating liquids by means of heating elements extending substantially vertically therethrough and having means for introducing liquid near the bottom of the chamber and means for withdrawing liquid near the top of the chamber, the combination of a substantially horizontally and centrally disposed baffle plate positioned near the bottom of the chamber and having edges near the sides of the chamber, and a second baffle of substantially frusto-conical form extending inwardly and upwardly from the side walls of the shell a short distance above said first named baffle.

5. In a heater, a substantially vertical shell having sides and a closed lower end and a transverse partition spaced upwardly from said closed end and separating a liquid heating space below the partition from a flue gas space above the partition, a combustion chamber positioned beneath the shell, tubes for conducting products of combustion from said chamber to the gas space above the partition, baffles in the lower end of said liquid heating space a short distance above said closed end, one of said baffles being substantially flat and centrally located with its side edges spaced from the side walls of the heater, the other of said baffles being substantially annular in shape and attached to and extending inwardly from the side wall of the heater in close proximity to said first-named baffle and conduits for supplying liquid to and withdrawing liquid from said liquid heating space.

CHARLES PRATER.
HAROLD F. BRINDEL.